US010915112B2

(12) United States Patent
Nix (10) Patent No.: US 10,915,112 B2
(45) Date of Patent: Feb. 9, 2021

(54) AUTONOMOUS VEHICLE SYSTEM FOR BLENDING SENSOR DATA

(71) Applicant: UATC, LLC, San Francisco, CA (US)

(72) Inventor: Molly Nix, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 286 days.

(21) Appl. No.: 15/613,636

(22) Filed: Jun. 5, 2017

(65) Prior Publication Data
US 2018/0284779 A1 Oct. 4, 2018

Related U.S. Application Data

(60) Provisional application No. 62/479,639, filed on Mar. 31, 2017.

(51) Int. Cl.
| | |
|---|---|
| *G05D 1/02* | (2020.01) |
| *G05D 1/00* | (2006.01) |
| *G08G 1/0962* | (2006.01) |
| *G08G 1/00* | (2006.01) |
| *G01S 17/89* | (2020.01) |
| *G01C 21/36* | (2006.01) |
| *B60W 40/02* | (2006.01) |
| *G01S 7/51* | (2006.01) |
| *G01S 17/931* | (2020.01) |
| *G08G 1/04* | (2006.01) |

(52) U.S. Cl.
CPC ............ *G05D 1/024* (2013.01); *B60W 40/02* (2013.01); *G01C 21/3697* (2013.01); *G01S 7/51* (2013.01); *G01S 17/89* (2013.01); *G01S 17/931* (2020.01); *G05D 1/0044* (2013.01); *G08G 1/0962* (2013.01); *G08G 1/202* (2013.01); *G08G 1/04* (2013.01)

(58) Field of Classification Search
CPC ...................................................... G05D 1/024
See application file for complete search history.

(56) References Cited

U.S. PATENT DOCUMENTS

| | | | | |
|---|---|---|---|---|
| 7,451,005 B2 * | 11/2008 | Hoffberg | ................ | G05B 15/02 700/83 |
| 8,355,834 B2 * | 1/2013 | Duggan | ............... | G05D 1/0061 244/75.1 |
| 8,768,539 B1 | 7/2014 | Clement et al. | | |
| 9,378,640 B2 * | 6/2016 | Mimeault | ............. | G01S 17/023 |

(Continued)

*Primary Examiner* — Michael A Berns
(74) *Attorney, Agent, or Firm* — Dority & Manning, PA (57) ABSTRACT

Systems and methods for generating blended sensor-based (LIDAR-based) visualizations are provided. In one example embodiment, a computer implemented method includes obtaining sensor data associated with a surrounding environment of the autonomous vehicle. The sensor data is acquired via a LIDAR system of the autonomous vehicle. The method includes generating a first style sheet associated with the surrounding environment of the autonomous vehicle based at least in part on the sensor data. The method includes generating a second style sheet associated with the surrounding environment of the autonomous vehicle based at least in part on the sensor data. The method includes providing an output for display via a user interface of a display device. The output includes a visualization of the surrounding environment of the autonomous vehicle based at least in part on the first style sheet and the second style sheet.

19 Claims, 5 Drawing Sheets

(56) References Cited

U.S. PATENT DOCUMENTS

| | | | |
|---|---|---|---|
| 2004/0268306 A1* | 12/2004 | Cheng | G06F 17/2247 |
| | | | 717/114 |
| 2015/0081156 A1* | 3/2015 | Trepagnier | G01S 17/023 |
| | | | 701/26 |
| 2017/0039765 A1* | 2/2017 | Zhou | G06T 19/006 |
| 2018/0136651 A1* | 5/2018 | Levinson | G05D 1/0044 |

* cited by examiner

AUTONOMOUS VEHICLE SYSTEM FOR BLENDING SENSOR DATA

CROSS-REFERENCE TO RELATED APPLICATION

The present application is based on and claims priority to U.S. Provisional Application 62/479,639 having a filing date of Mar. 31, 2017, which is incorporated by reference herein.

FIELD

The present disclosure relates generally to improved generation and visualization of blended autonomous vehicle sensor data.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of generating blended LIDAR-based visualizations. The method includes obtaining, by one or more computing devices onboard an autonomous vehicle, sensor data associated with a surrounding environment of the autonomous vehicle. The sensor data is acquired via a LIDAR system of the autonomous vehicle. The method includes generating, by the one or more computing devices, a first style sheet associated with the surrounding environment of the autonomous vehicle based at least in part on the sensor data. The method includes generating, by the one or more computing devices, a second style sheet associated with the surrounding environment of the autonomous vehicle based at least in part on the sensor data. The method includes providing, by the one or more computing devices, an output for display via a user interface of a display device, the output comprising a visualization of the surrounding environment of the autonomous vehicle based at least in part on the first style sheet and the second style sheet.

Another example aspect of the present disclosure is directed to a computing system for generating blended LIDAR-based visualizations. The system includes one or more processors on-board an autonomous vehicle and one or more tangible, non-transitory, computer readable media on-board the autonomous vehicle that collectively store instructions that when executed by the one or more processors cause the computing system to perform operations. The operations include obtaining, via a LIDAR system that emits one or more ranging lasers, sensor data associated with a surrounding environment of the autonomous vehicle. The operations include generating a first style sheet associated with the surrounding environment of the autonomous vehicle based at least in part on the sensor data. The first style sheet is descriptive of at least a portion of the surrounding environment based at least in part on a respective height of each of the one or more ranging lasers. The operations include generating a second style sheet associated with the surrounding environment of the autonomous vehicle based at least in part on the sensor data. The second style sheet is descriptive of at least a portion of the surrounding environment based at least in part on a reflective intensity of one or more of the ranging lasers. The operations include providing an output for display via a user interface of a display device. The output includes a visualization of the surrounding environment of the autonomous vehicle based at least in part on a blending of the first style sheet and the second style sheet.

Yet another example aspect of the present disclosure is directed to an autonomous vehicle. The autonomous vehicle includes a LIDAR system, one or more processors, and one or more tangible, non-transitory, computer readable media that collectively store instructions that when executed by the one or more processors cause the one or more processors to perform operations. The operations include obtaining sensor data associated with the surrounding environment of the autonomous vehicle. The sensor data is acquired via the LIDAR system. The operations include generating a first style sheet associated with the surrounding environment of the autonomous vehicle based at least in part on the sensor data. The operations include generating a second style sheet associated with the surrounding environment of the autonomous vehicle based at least in part on the sensor data. The operations include providing an output for display via a user interface of a display device. The output includes a visualization of the surrounding environment of the autonomous vehicle based at least in part on the first style sheet and the second style sheet.

Other example aspects of the present disclosure are directed to systems, methods, vehicles, apparatuses, tangible, non-transitory computer-readable media, and memory devices for generating blended sensor-based (LIDAR-based) visualizations.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to generating and presenting a blended LIDAR-based visualization associated with an autonomous vehicle for a more accurate representation of vehicle environment perception (and/or other functions). For instance, an autonomous vehicle can acquire sensor data associated with the surrounding environment of the autonomous vehicle to help perceive its surroundings via an on-board Light Detection and Ranging (LIDAR) system to acquire the sensor data. The sensor data can include the location (e.g., in three-dimensional space relative to the LIDAR system) of a number of points that correspond to objects that have reflected one or more ranging lasers emitted by the LIDAR system. To help create a visualization of the vehicle's surroundings based on the sensor data acquired via the LIDAR system, the autonomous vehicle can process the sensor data to create style sheets that are descriptive of the surrounding environment, including the objects within (e.g., pedestrians, other vehicles, lane markings) the surrounding environment. For instance, the autonomous vehicle can create a first style sheet that describes at least a portion of the surrounding environment using a LIDAR by height type representation (e.g., based at least in part on a respective height of the LIDAR ranging lasers). The autonomous vehicle can also create a second style sheet that describes at least a portion of the surrounding environment using a LIDAR by intensity type representation (e.g., based at least in part on a reflective intensity of the ranging lasers with respect to the object).

The autonomous vehicle can process the first and second style sheets to create an output that incorporates both the LIDAR by height and the LIDAR by intensity type representations. The autonomous vehicle can generate the output based at least in part a blending of the first and second style sheets. The output can include a visualization that presents (e.g., on a user interface of a display device) the at least a portion of the surrounding environment of the autonomous vehicle using both the LIDAR by height and the LIDAR by intensity type representations. This can be helpful as some objects (e.g., pedestrians) can be more appropriately represented by LIDAR by height, while other objects (e.g., lane markings) can be more appropriately represented by LIDAR by intensity. In this way, the autonomous vehicle can generate a more accurate visual representation of the environment perceived by the autonomous vehicle, allowing for better vehicle anomaly detection and perception fault diagnosis.

More particularly, an autonomous vehicle (e.g., a ground-based vehicle, air-based vehicle, other vehicle type) can include a vehicle computing system that implements a variety of systems on-board the autonomous vehicle. For instance, the vehicle computing system can include one or more data acquisition system(s), an autonomy computing system (e.g., for determining autonomous navigation), one or more vehicle control system(s) (e.g., for controlling braking, steering, powertrain), one or more human-machine interfaces (e.g., for interfacing with a vehicle passenger), etc.

The data acquisition system(s) include a Light Detection and Ranging (LIDAR) system and/or other sensors that are configured to acquire sensor data associated with the surrounding environment of the autonomous vehicle. The LIDAR system can include various types of emitters and/or detectors, such as various types of lasers and photometric detectors. The LIDAR system can emit (e.g., over 360 degrees) ranging lasers, such as focused, low-power beams of light of a specified wavelength, and can detect and record the reflection of such wavelengths of light from various objects. The sensor data can include information that describes the location of static and/or non-static objects (e.g., lane markings, pedestrians, vehicles) within the surrounding environment of the autonomous vehicle. By way of example, for the LIDAR system, the sensor data can include the location (e.g., in three-dimensional space relative to the LIDAR system) of a plurality of points that correspond to a portion of the surrounding environment (e.g., one or more objects) that have reflected a ranging laser. For example, a LIDAR system can measure distances by measuring the Time of Flight (TOF) that it takes a laser pulse to travel from the emitter to an object and back to a detector, calculating the distance from the known speed of light. Such detected data can be used to generate a LIDAR point cloud representing the points of light reflected from the object and returning to the detector, thus indicating specific points of the object present in the environment. The LIDAR system can acquire the sensor data in real-time, as the autonomous vehicle is in motion and can provide the sensor data to the vehicle computing system for processing.

The vehicle computing system can obtain the sensor data acquired by the LIDAR system (and/or other sensors) and generate various styles sheets based at least in part on the sensor data. The style sheets can include cascading style sheets and/or other style sheet languages that include, for example, a set of rules describing certain characteristics (e.g., colors, layouts) for visual presentation. For instance, the vehicle computing system can generate a first style sheet associated with the surrounding environment of the autonomous vehicle based at least in part on the sensor data. The first style sheet can be descriptive of at least a portion of the surrounding environment based at least in part on the respective height of the LIDAR ranging lasers. By way of example, the LIDAR system can include a plurality of emitters and/or detectors oriented vertically (e.g., perpendicular to the vehicle). Each emitter/detector can be assigned a distinct color from the other emitters/detector. The first style sheet can describe, for example, a portion of the surrounding environment (e.g., including an object) using the color scheme to indicate which of the emitted lasers were detected the ranging laser reflected from the surrounding environment. In this way, the first style sheet can describe at least a portion of the surrounding environment using a LIDAR by height type representation.

The vehicle computing system can also generate a second style sheet associated with the surrounding environment of the autonomous vehicle. The second style sheet can be different from the first style sheet. For example, the second style sheet can be descriptive of at least a portion of the surrounding environment based at least in part on a reflective intensity of a ranging laser with respect to the surrounding environment of the autonomous vehicle. The strength of the return can vary with the composition of the object reflecting the return. The second style sheet can represent the strength or magnitude of the intensity of the reflected laser from that portion of the surrounding environment (e.g., a lane marking) with a black-and-white or gray scale scheme. In this way, the second style sheet can describe an at least a portion of the surrounding environment using a LIDAR by intensity type representation.

The vehicle computing system can blend the first and second style sheets. For instance, the vehicle computing system can blend the first style sheet with the second style sheet using a multiply blend mode, standard opacity blend mode, other blend modes, a blending function, and/or a combination thereof. Such combination can allow at least a portion of the surrounding environment of the autonomous vehicle to be presented using both the LIDAR by height type representation and the LIDAR by intensity type representation.

The vehicle computing system can generate an output based at least in part on the first style sheet and the second style sheet. For instance, the vehicle computing system can generate a visualization of the surrounding environment of the autonomous vehicle based at least in part on the blended first and second style sheets. The visualization can present at least a portion of the surrounding environment of the autonomous vehicle based at least in part on the respective height of each of the one or more ranging lasers (e.g., LIDAR by height) and based at least in part on the reflective intensity of one or more of the ranging lasers with respect to that object (e.g., LIDAR by intensity). For example, the visualization can present an object within the surrounding environment (e.g., pedestrian, lane marking) using both the LIDAR by height and the LIDAR by intensity type representations.

The vehicle computing system can provide an output (including the visualization) for display via a user interface of a display device. In some implementations, the display device can be located on-board the vehicle (e.g., as part of the human-machine interface system) to display the visualization for a passenger of the vehicle. In some implementations, the display device can be off-board the autonomous vehicle for display at a location that is remote from the autonomous vehicle.

In some implementations, the visualization can include other information associated with the autonomous vehicle. For instance, as described above, the autonomous vehicle can include an autonomy computing system. The autonomy computing system can include various sub-systems that cooperate to perceive the surrounding environment of the autonomous vehicle and determine a motion plan for controlling the motion of the autonomous vehicle. For example, the autonomy system can include a perception system, a prediction system, and a motion planning system. The perception system can process the sensor data from the data acquisition system(s) (e.g., LIDAR system) to detect one or more object(s) that are proximate to the autonomous vehicle as well as state data associated therewith. The perception system can output perception data associated with each object detected within the surrounding environment of the autonomous vehicle. For instance, the perception data can include an identifier shape of an object (e.g., a parked vehicle) within the surrounding environment. In some implementations, the vehicle computing system can receive the perception data and can include the identifier shape of the object in the visualization presented via a user interface. Additionally, or alternatively, the prediction system can create predicted data associated with a detected object. The predicted data can be indicative of a predicted trajectory along which the respective object is predicted to travel over time. The prediction system can provide the predicted data to the vehicle computing system such that the predicted trajectory of an object can be included in the visualization. Moreover, the motion planning system can plan the motion of the autonomous vehicle (e.g., based at least in part on the perception and prediction data). The motion planning system can generate motion planning data that is indicative of a planned trajectory of the autonomous vehicle. The vehicle computing system can obtain the motion planning data and include the planned trajectory within the visualization to be displayed via the user interface. In this way, the vehicle computing system can provide a visual representation of the operation of other critical vehicle systems.

The systems, methods, and vehicles described herein may provide a number of technical effects and benefits. For instance, the vehicle computing system can locally (e.g., on-board the vehicle) acquire sensor data associated with the vehicle's surroundings, process the data to create unique style sheets, blend the style sheets, and provide a visualization of how the vehicle perceives its surroundings. The vehicle computing system can be configured to continuously perform this process as the vehicle travels and different objects become proximate to the autonomous vehicle. As such, the vehicle computing system can provide an accurate, real-time representation of how the vehicle perceives it surroundings to the riders of the vehicle and/or to a remote operator (e.g., operating a fleet of vehicles). This can help improve user-trust associated with the autonomous vehicle as it autonomously navigates (without human interaction) to a destination point.

The systems, methods, and vehicles described herein also provide an improvement to vehicle computing technology, such as autonomous vehicle computing technology. For instance, aspects of the present disclosure enable a vehicle computing system to more accurately represent how the vehicle perceives its surrounding environment in real-time, allowing for better system performance evaluation, anomaly diagnosis, maintenance planning, etc. For instance, one or more computing devices (on-board the autonomous vehicle) can obtain sensor data associated with the surrounding environment of the autonomous vehicle. As described herein, the sensor data can be acquired via the LIDAR system of the autonomous vehicle. The computing device(s) can generate a first style sheet associated with the surrounding environment of the autonomous vehicle based at least in part on the sensor data, as well as a second style sheet (e.g., different from the first style sheet). The computing device(s) can blend the first and second style sheets. The computing device(s) can provide an output for display via a user interface of a display device. The output can include a visualization of the surrounding environment of the autonomous vehicle based at last in part on the blending of the first and second style sheets. In this way, the visualization can provide a tailored presentation of the surrounding environment of the vehicle based on the different style sheets. For example, the visualization can represent at least a portion of the surrounding environment using a LIDAR by height type representation and a LIDAR by intensity type representation. Such blended visualization can leverage the advantages of each type of representation and allow for a more accurate representation of how the vehicle perceives its surroundings. While additional processing may be required, the systems and methods nonetheless enable the vehicle computing system to provide a more accurate, real-time blended LIDAR-based visualization of the vehicle's surroundings that can allow for easier, more efficient detection of vehicle anomalies (e.g., associated with the vehicle's LIDAR system). Moreover, the systems and methods of the present disclosure enable the vehicle computing system to output a visualization that represents other functions of the vehicle (e.g., perception system, prediction system, motion planning system). A visualization of data related to such functions can allow for more efficient performance evaluation and fault diagnosis of the respective systems.

Figure 1:
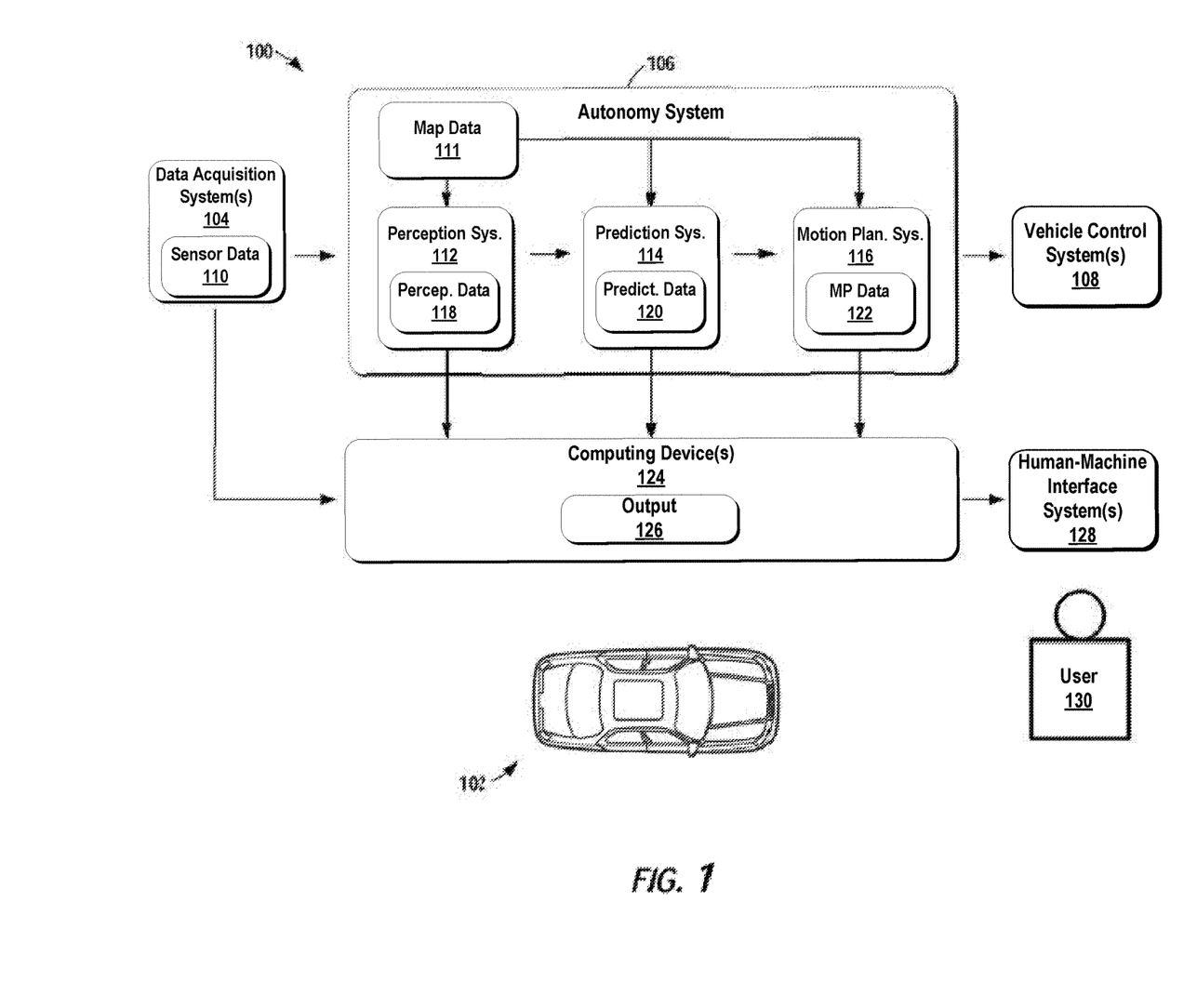
FIG. 1 depicts an example system overview according to example embodiments of the present disclosure.

With reference now to the FIGS., example embodiments of the present disclosure will be discussed in further detail. FIG. 1 depicts an example vehicle computing system 100 of a vehicle 102 according to example embodiments of the present disclosure. The vehicle 102 incorporating the vehicle computing system 100 can be a ground-based autonomous vehicle (e.g., car, truck, bus), an air-based autonomous vehicle (e.g., airplane, drone, helicopter, or other aircraft), or other types of vehicles (e.g., watercraft). The vehicle 102 can be an autonomous vehicle that can drive, navigate, operate, etc. with minimal and/or no interaction from a human driver. For example, the vehicle 102 can be configured to operate in one or more modes such as, for example, a fully autonomous operational mode and/or a semi-autonomous operational mode. A fully autonomous (e.g., self-driving) operational mode can be one in which the autonomous vehicle can provide driving and navigational operation with no interaction from a human driver. A semi-autonomous operational mode can be one in which the autonomous vehicle can operate with some interaction from a human driver present in the vehicle. In some implementations, the vehicle 102 can be associated with an entity (e.g., owner, manager, operator, a service provider) that provides one or more vehicle services to a plurality of users via a fleet of vehicles that includes, for example, the vehicle 102. The vehicle services can include transportation services (e.g., rideshare services), courier services, delivery services, and/or other types of services.

The vehicle 102 can include one or more data acquisition systems 104, an autonomy system 106, and one or more vehicle control systems 108. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The data acquisition system(s) 104 can be configured to obtain sensor data 110 associated with associated with a surrounding environment of the autonomous vehicle. The data acquisition system(s) 104 can include sensors configured to acquire the sensor data 110, as further described herein. The sensor data 110 can include image data, RADAR data, LIDAR data, and/or other data acquired by the data acquisition system(s) 104. The sensor data 110 can be associated with one or more objects that are proximate to the vehicle 102 (e.g., within a field of view of one or more of the data acquisition system(s) 104). The object(s) can include, for example, vehicles, bicycles, pedestrians, and/or other objects (e.g., lane markings, sidewalks). The sensor data 110 can be indicative of characteristics (e.g., locations) associated with the object(s) within the surrounding environment of the vehicle 102 at one or more times.

The data acquisition system(s) 104 can include various types of sensors. For example, the data acquisition system(s) 104 can include a Light Detection and Ranging (LIDAR), a Radio Detection and Ranging (RADAR) system, one or more cameras (e.g., visible spectrum cameras, infrared cameras, etc.), and/or other types of that are configured to acquire the sensor data 110 associated with the surrounding environment of the vehicle 102. A LIDAR system can include various types of emitters and/or detectors, such as various types of lasers and photometric detectors. The LIDAR system can emit (e.g., over 360 degrees) one or more ranging lasers. For example, the ranging lasers can be focused, low-power beams of light of a specified wavelength, and can detect and record the reflection of such wavelengths of light from various objects. The sensor data 110 can include information that describes at least a portion of the surrounding environment of the vehicle 102. For instance, the sensor data 110 can be indicative of the location of static and/or non-static objects (e.g., lane markings, pedestrians, vehicles) within the surrounding environment of the vehicle 102. For the LIDAR system, the sensor data 110 can include a plurality of points that correspond to a portion of the surrounding environment that have reflected a ranging laser within a three-dimensional space relative to the LIDAR system (e.g., as the vehicle is in motion, while the vehicle is stopped). For example, a LIDAR system can measure distances by measuring the Time of Flight (TOF) that it takes a laser pulse to travel from the emitter to an object and back to a detector, calculating the distance from the known speed of light. Such detected data can be used to generate a LIDAR point cloud representing the points of light reflected from the object and returning to the detector, thus indicating specific points of the object present in the environment. The LIDAR system can acquire the sensor data 110 in real-time or near real-time (e.g., as the vehicle 102 is in motion) and can provide the sensor data 110 for processing.

In addition to the sensor data 110, the vehicle computing system 100 can retrieve or otherwise obtain map data 111 associated with the surrounding environment of the vehicle 102. The map data 111 can provide detailed information about the surrounding environment of the vehicle 102. For example, the map data 111 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or the boundary marking associated therewith); traffic control data (e.g., the location and instructions of signage, traffic lights, or other traffic control devices); and/or any other map data that provides information that assists the vehicle 102 in comprehending and perceiving its surrounding environment and its relationship thereto.

The autonomy computing system 106 can include a perception system 112, a prediction system 114, and a motion planning system 116 that cooperate to perceive the surrounding environment of the vehicle 102 and determine a motion plan for controlling the motion of the vehicle 102 accordingly. For example, autonomy system 106 can receive the sensor data 110 from the data acquisition system(s) 104, attempt to comprehend the surrounding environment by performing various processing techniques on data collected by the data acquisition system(s) 104, and generate an appropriate motion plan through such surrounding environment. The computing device(s) 124 can control the one or more vehicle control systems 108 to operate the vehicle 102 according to the motion plan.

The perception system 112 can identify one or more objects that are proximate to the vehicle 102 based at least in part on the sensor data 110 and/or the map data 111. For example, the perception system 112 can generate perception data 118 descriptive of a current state of an object that is proximate to the vehicle 102. The perception data 118 for each object can describe, for example, an estimate of the object's current location (also referred to as position); current speed (also referred to as velocity); current acceleration, current heading; current orientation; size/footprint (e.g., as represented by a bounding polygon); class (e.g., pedestrian class vs. vehicle class vs. bicycle class), and/or other state information. In some implementations, the perception data 118 can be indicative of an identifier shape of at least one object (e.g., a parked vehicle, moving vehicle) within the surrounding environment of the vehicle 102. The identifier shape can be, for instance, a bounded or unbounded polygon or other shape that identifies an object within the surrounding environment of the vehicle 102. The perception data 118 can be provided to the prediction system 114.

The prediction system 114 can create predicted data 120 associated with each of the respective one or more objects proximate to the vehicle 102. The predicted data 120 can be indicative of one or more predicted future locations of each respective object. The predicted data 120 can be indicative of a predicted path (e.g., predicted trajectory) of at least one object within the surrounding environment of the autonomous vehicle 102. For example, the predicted path (e.g., trajectory) can indicate a path along which the respective object is predicted to travel over time (and/or the speed at which the object is predicted to travel along the predicted path). The prediction system 114 can provide the predicted data 120 associated with the object(s) to the motion planning system 116.

The motion planning system 116 can determine a motion plan for the vehicle 102 based at least in part on the predicted data 120. The motion plan can include vehicle actions with respect the objects proximate to the vehicle 102 as well as the predicted movements. For instance, the motion planning system 116 can implement an optimization algorithm that considers cost data associated with a vehicle action as well as other cost functions (e.g., based on speed limits, traffic lights, etc.), if any, to determine optimized variables that make up the motion plan. By way of example, the motion planning system 116 can also determine that the vehicle 102 can perform a certain action (e.g., pass an object) without increasing the potential risk to the vehicle 102 and/or violating any traffic laws (e.g., speed limits, lane boundaries, signage). The motion plan can include a planned trajectory, speed, acceleration, etc. of the vehicle 102.

The motion planning system 116 can provide motion planning data 122 indicative of a planned trajectory (and/or other motion parameters) to the vehicle control system(s) 108 to implement the motion plan for the vehicle 102. For instance, the vehicle 102 can include a mobility controller configured to translate the motion plan into instructions. By way of example, the mobility controller can translate a determined motion plan into instructions to adjust the steering of the vehicle 102 "X" degrees, apply a certain magnitude of braking force, etc. The mobility controller can send one or more control signals to the vehicle control components (e.g., braking control component, steering control component) to execute the instructions and implement the motion plan.

The vehicle computing system 100 can also include one or more computing device(s) 124 configured to blend data associated with the vehicle 102 and generate visualizations associated therewith. The computing device(s) 124 can be included with and/or be separate from the autonomy system 106. The computing device(s) 124 can include one or more processors on-board the vehicle 102 and one or more tangible, non-transitory, computer readable media on-board the vehicle 102. The one or more tangible, non-transitory, computer readable media can collectively store instructions that when executed by the one or more processors cause the processors (e.g., the vehicle computing system 100) to perform operations such as, for example, to obtain vehicle data and generate blended LIDAR-based (or other sensor-based) visualizations.

The computing device(s) 124 can be configured to obtain the sensor data 110 associated with the surrounding environment of the vehicle 102. The surrounding environment can include one or more objects. The object(s) can include at least one of a static object that is not in motion or a non-static object that is in motion. The computing device(s) can acquire the sensor data via a LIDAR system (e.g., that emits one or more ranging lasers) of the vehicle 102. As described herein, the sensor data 110 from the LIDAR system can be indicative of a plurality of points that correspond to at least a portion of the surrounding environment that have reflected one or more ranging lasers within a three-dimensional space relative to the LIDAR system (e.g., as the vehicle 102 is in motion).

Figure 2:
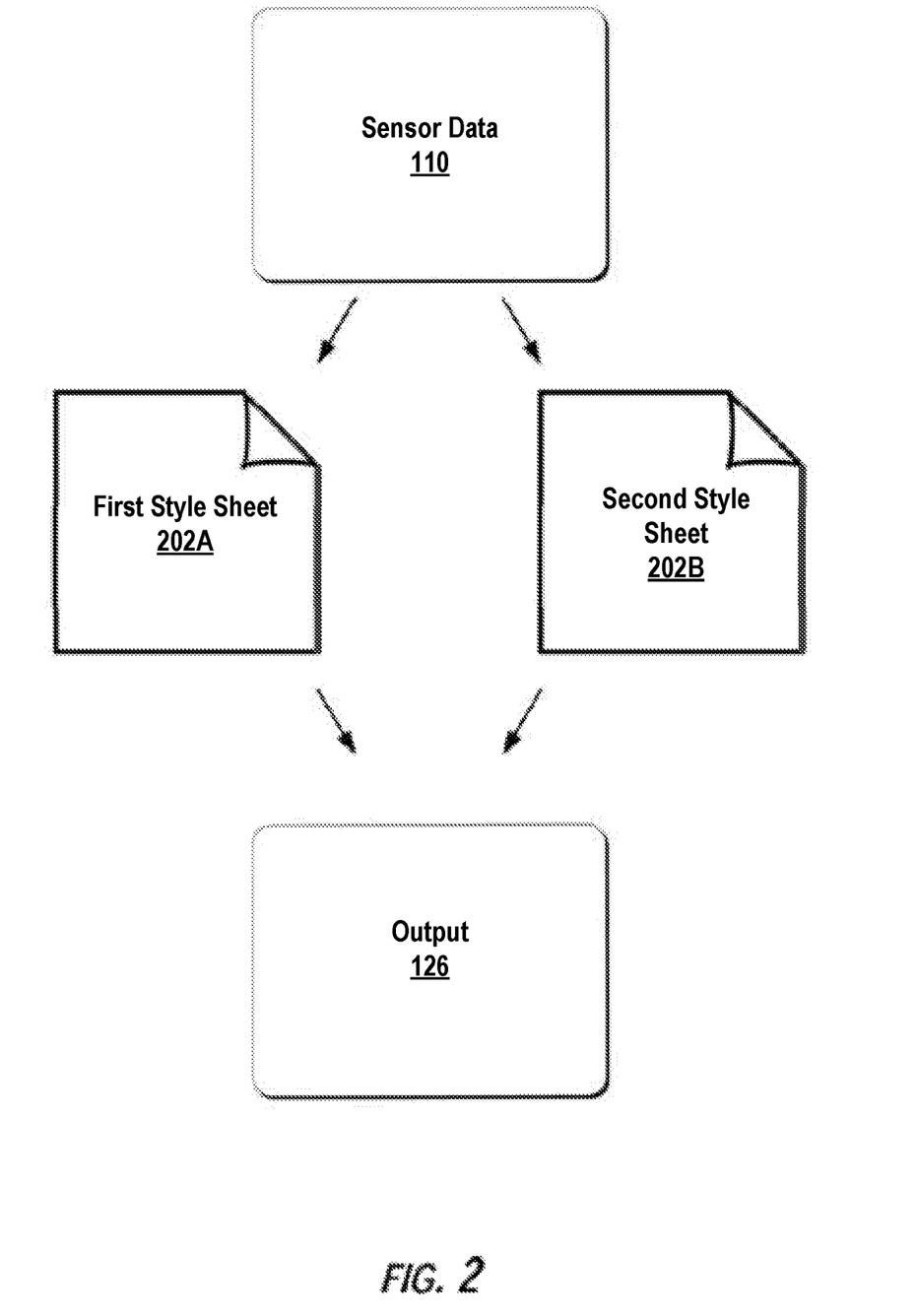
FIG. 2 depicts example style sheets according to example embodiments of the present disclosure.

The computing device(s) 124 can be configured to generate various style sheets based at least in part on the sensor data 110. For instance, FIG. 2 depicts example style sheets 202A-B according to example embodiments of the present disclosure. The style sheets 202A-B can include cascading style sheets and/or other style sheet languages that include, for example, a set of rules describing certain characteristics (e.g., colors, layouts) for visual presentation. For instance, the computing device(s) 124 can generate a first style sheet 202A associated with the surrounding environment of the vehicle 102 based at least in part on the sensor data 110. The first style sheet can be descriptive of at least a portion of the surrounding environment of the vehicle 102 based at least in part on a respective height of each of the one or more ranging lasers of the LIDAR system. By way of example, the LIDAR system can include a plurality of emitters and/or detectors oriented vertically (e.g., perpendicular to the vehicle). The first style sheet can include a color scheme that is based at least in part on the respective height of each of the one or more ranging lasers. For example, each emitter/detector can be assigned a distinct color from the other emitters/detector. The first style sheet 202A can describe at least a portion of the surrounding environment (e.g., an object, travel way) using the color scheme to indicate which of the emitted lasers were detected as the ranging lasers reflected from the surrounding environment. The first object can be, for example, a vehicle or a pedestrian that is proximate to the vehicle 102. In this way, the first style sheet 202A can describe at least a portion of the surrounding environment using a LIDAR by height type representation.

The computing device(s) 124 can also be configured to generate a second style sheet 202B associated with the surrounding environment of the vehicle 102 based at least in part on the sensor data 110. The second style sheet 202B can be different from the first style sheet 202A. For example, the second style sheet 202B can be descriptive of at least a portion of the surrounding environment (e.g., the same portion as the first style sheet) based at least in part on a reflective intensity of one or more of the ranging lasers (of the LIDAR system) with respect to the surrounding environment. For example, the portion of the surrounding environment can include an object such as, for example, a lane marking. The strength of the return can vary with the composition of the portion of the surrounding environment reflecting the return. The second style sheet 202B can represent the strength or magnitude of the intensity of the reflected laser from the surrounding environment (e.g., a lane marking) with a black-and-white or grayscale scheme. In this way, the second style sheet 202B can described at least a portion of the surrounding environment of the vehicle 102 using a LIDAR by intensity type representation.

The computing device(s) 124 can blend the first style sheet 202A and the second style sheet 202B. The computing device(s) 124 can blend the first style sheet 202A and the second style sheet 202B using a variety of modes. For instance, the computing device(s) 124 can blend the first style sheet 202A with the second style sheet 202B using a multiply blend mode, standard opacity blend mode, other blend modes, a blending function, and/or a combination thereof. For example, the first style sheet 202A (e.g., LIDAR by height) can be associated with a blue color (or within a blue color scheme) and the second style sheet 202B (e.g., LIDAR by intensity) can be associated with a gray scale. The blending techniques can include for example blending by multiplying the RGB values (e.g., blue×gray=darker blue). In some implementations, as further described herein, the detected objects can be associated with another, distinct color (e.g., orange) to help further distinguish the elements of the vehicle's surrounding environment. The blending of the style sheets can describe least one object within the surrounding environment of the autonomous vehicle using a LIDAR by height type representation and a LIDAR by intensity type representation. By way of example, the blending of the first style sheet 202A and the second style sheet 202B can allow for an object (e.g., a vehicle, pedestrian, lane marking) to be described using the LIDAR by height type representation of the first style sheet 202A and using the LIDAR by intensity type representation of the second style sheet 202B. By utilizing both representation types, the objects can be represented in a customized manner that may be more appropriate for that respective object (e.g., LIDAR by height type can further help describe a vehicle, LIDAR by intensity can further help describe a lane marking).

The computing device(s) 126 can generate an output 126 based at least in part on the part on the first style sheet and the second style sheet. For instance, the output 126 can be based at least in part on the blending of the first style sheet and the second style sheet. The output 126 can include a visualization of the surrounding environment of the vehicle 102 based at least in part on a blending of the first style sheet 202A and the second style sheet 202B.

Returning to FIG. 1, the computing device(s) 124 can provide the output 126 for display (e.g., via a user interface of a display device). In some implementations, the computing device(s) 124 can provide the output 126 for display onboard the vehicle 102 (e.g., via one or more human machine interface system(s) 128) for a user 130. The user 130 can be a passenger of the vehicle 102 (e.g., riding for a rideshare service), a driver of the vehicle 102, a technician/maintenance worker of the vehicle 102, and/or another type of user. Additionally, or alternatively, the computing device(s) 124 can provide the output 126 for display on a display device that is remote from the vehicle 102 (e.g., at a central operations computing system), for a user that is remote from the vehicle 102.

Figure 3:
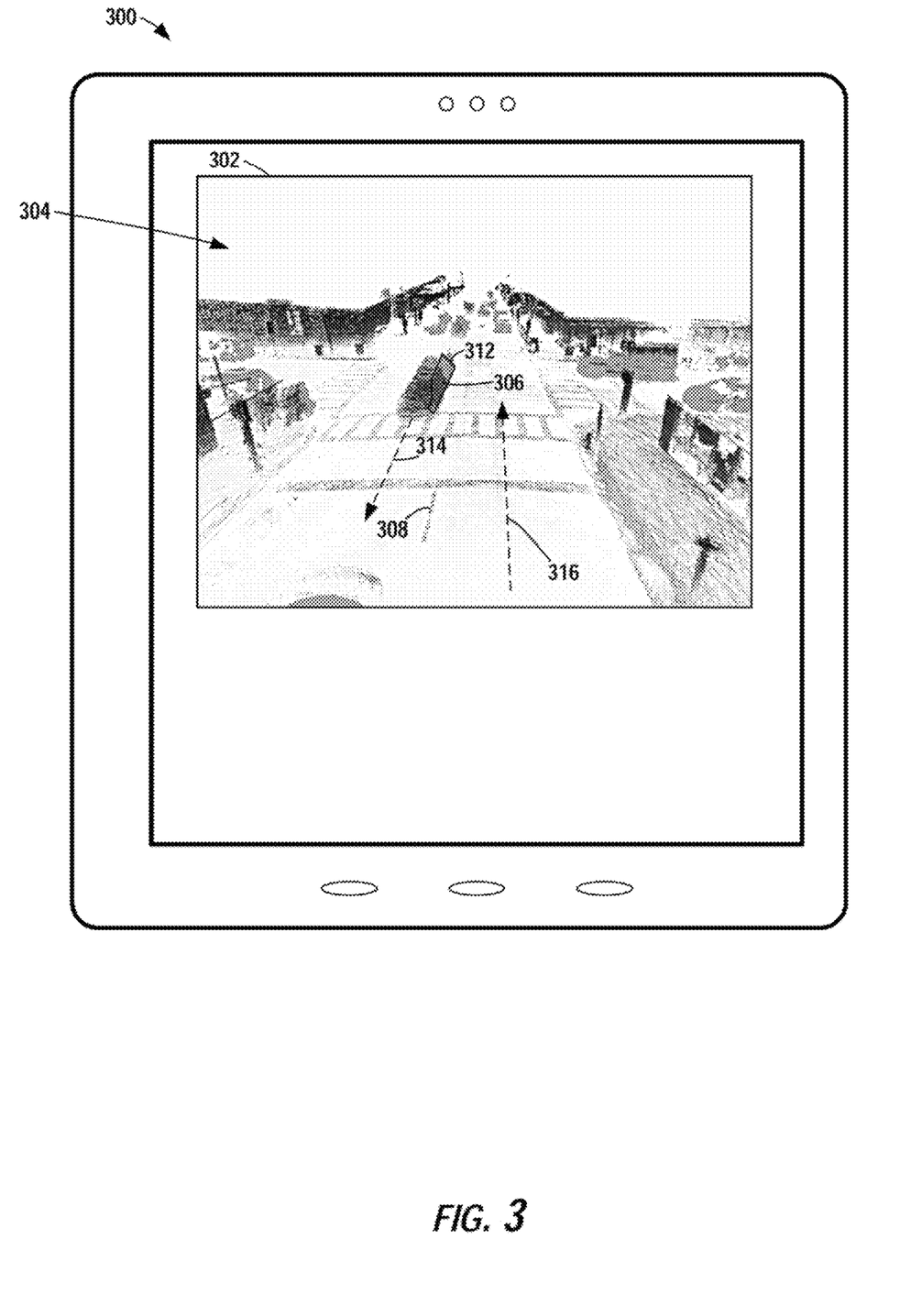
FIG. 3 depicts an example display device with a user interface according to example embodiments of the present disclosure.

FIG. 3 depicts an example display device 300 with a user interface 302 according to example embodiments of the present disclosure. The visualization 304 (e.g., of the output 126) can be displayed via the user interface 302 of the display device 300. As described herein, the display device 300 can be located on-board the vehicle 102. The display device 300 can be configured to display the visualization 304 via the user interface 302 to a user 130 (e.g., a passenger, driver) of the vehicle 102. In some implementations, the display device 300 can be remote from the vehicle 102 and can be configured to display the visualization 304 via the user interface 302 at a location that is remote from the vehicle 102. The user interface 302 (presenting the visualization 304) can be displayed in real-time as the vehicle 102 is in motion. In this way, a user can quickly review the visualization 304 and determine how the vehicle's sensors, perception, prediction, motion planning, etc. systems are performing as the vehicle 102 is travelling.

The visualization 304 can visually present at least a portion of the surrounding environment of the vehicle 102. The visualization 304 can present at least a portion of the surrounding environment of the vehicle 102 based at least in part on the respective height of each of the one or more ranging lasers (e.g., using a LIDAR by height type representation) and based at least in part on the reflective intensity of one or more of the ranging lasers with respect the surrounding environment. For example, the visualization 304 can present at least one first object 306 (e.g., a vehicle) and/or at least one second object 308 (e.g., a lane marking) within the surrounding environment of the vehicle 102 based at least in part on the respective height of each of the one or more ranging lasers (e.g., using a LIDAR by height type representation) and based at least in part on the reflective intensity of one or more of the ranging lasers with respect to that object (e.g., a LIDAR by intensity type representation). The object(s) 306, 308 can be located in front of, to the side of, and/or behind the vehicle 102 within the surrounding environment. In some implementations, the visualization 304 can also depict the vehicle 102.

The visualization 304 can visually distinguish objects from one another within the visualization 304. In some implementations, the visualization 304 can depict different object types with different colors. For example, the visualization 304 can present an object (e.g., 306) that is associated with a first type of object (e.g., a pedestrian) with a first color (e.g., pink) and present another object 310 that is associated with a second object type (e.g., a vehicle) with a second color (e.g., blue) that is different than the first color. The visualization 304 can use other techniques for differentiating between objects (e.g., brightness, textures, other visual characteristics).

The visualization 304 can present static objects and/or non-static objects. The visualization 304 can depict at least one static object within the surrounding environment of the vehicle 102 such as, for example, a lane marking, a parked vehicle, etc. The visualization 304 can depict at least one non-static object within the surrounding environment of the vehicle 102, such as for example, a moving pedestrian, moving vehicle, etc. In some implementations, the visualization 304 can visually distinguish the static objects and the non-static based at least in part on color, brightness, texture, and/or other visual characteristics. For example, static objects can be presented in a first color scheme (e.g., gray scale, etc.) and non-static objects can be presented in a second color scheme (e.g., multi-color, rainbow scheme).

The visualization 304 can be presented in a variety of formats. For example, the visualization 304 can be presented in a cinematography (motion picture, video) format such that non-static objects can be presented as moving within the surrounding environment of the vehicle 102. For example, the visualization 304 can present a pedestrian travelling across a travel way at a plurality of locations over a plurality of times, as detected and determined by the vehicle 102. The visualization 304 can be presented in a still photography (non-motion picture) format such that all objects are presented at a single location at a single point in time within the surrounding environment of the vehicle 102. By way of example, the visualization 304 can present a travelling pedestrian at a single location at one point in time (e.g., within a travel way). In some implementations, the user interface 302 can include an indicator of the visualization format (e.g., a running clock, timestamp, etc.) and/or labels of the types of objects.

In some implementations, the visualization 304 can include other information associated with the vehicle 102. For instance, as described above, the vehicle 102 can include an autonomy computing system 106. In some implementations, the computing device(s) 124 can receive data from the autonomy computing system 106 and utilize such data to present additional information within the visualization 304. For example, the visualization 304 can include at least one of an identifier shape 312 of at least one object (e.g., static or non-static) within the surrounding environment of the vehicle 102, a predicted trajectory 314 of at least one object within the surrounding environment of the vehicle 102, or a planned trajectory 316 of the vehicle 102. The computing device(s) 124 can obtain the perception data 118 and can include the identifier shape 312 of the object 306 in the visualization presented via the user interface 302. The identifier shape 312 can represent the location of the object within the surrounding environment. In some implementations, the identifier shape 312 can indicate the approximate boundaries of the object. Additionally, or alternatively, the computing device(s) 124 can obtain the perception data 118 and include the predicted trajectory 314 in the visualization presented via the user interface 302. In some implementations, the computing device(s) 124 can obtain the motion planning data 122 and include the planned trajectory 316 of the vehicle 102 within the visualization displayed via the user interface 302. In some implementations, the visualization 304 can distinguish one or more of the identifier shape 312, the predicted trajectory 314, or the planned trajectory 316 from one another (and/or other depictions within the visualization 304) based at least in part on one or more visual characteristic(s) (e.g., color, texture, etc.).

Figure 4:
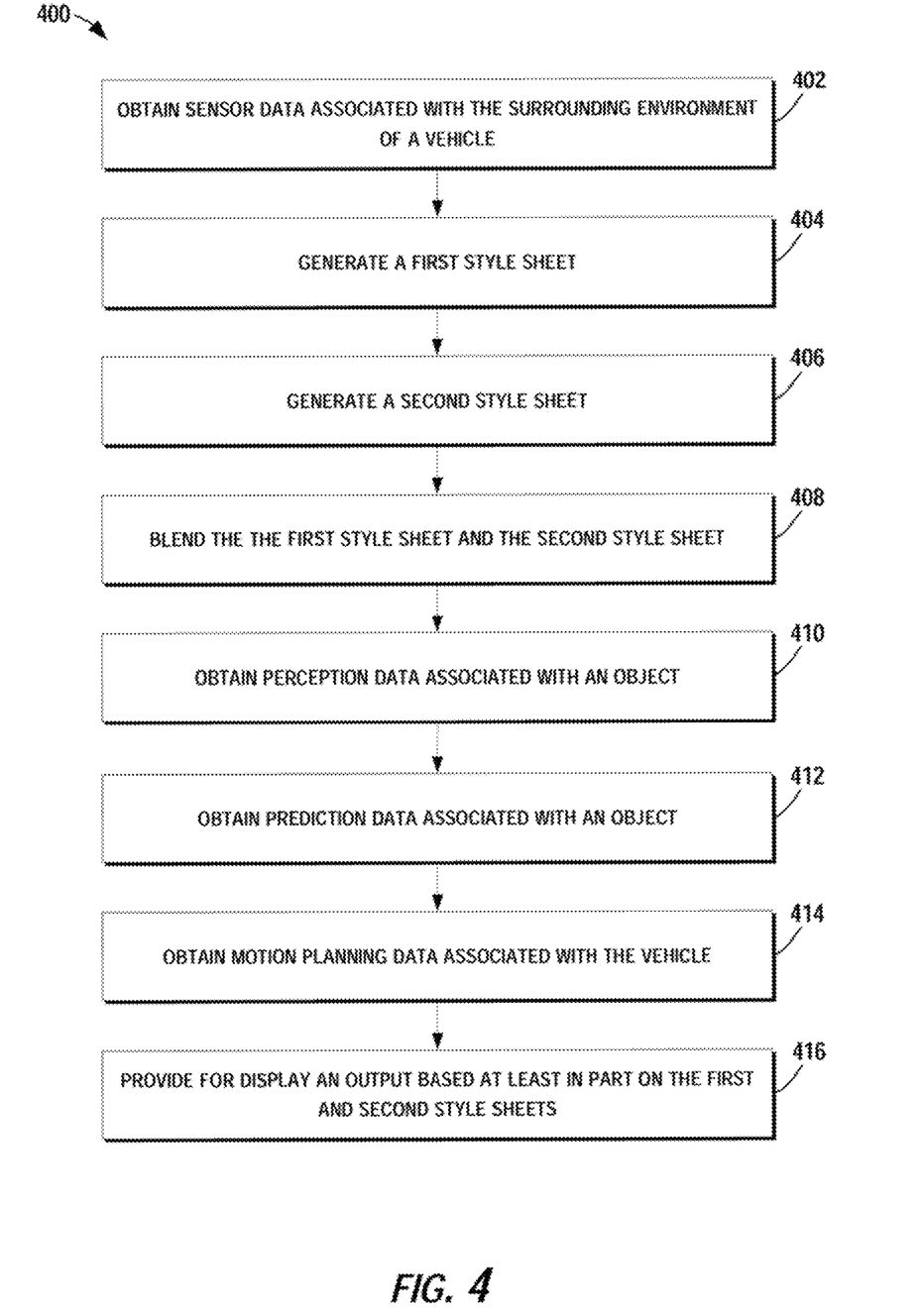
FIG. 4 depicts a flow diagram of an example method of generating blended sensor-based (LIDAR-based) visualizations according to example embodiments of the present disclosure.

FIG. 4 depicts a flow diagram of an example method 400 of generating blended sensor-based (e.g., LIDAR-based) visualizations according to example embodiments of the present disclosure. One or more portion(s) of the method 400 can be implemented by one or more computing devices such as, for example, the computing device(s) 124. Moreover, one or more portion(s) of the method 400 can be implemented as an algorithm on the hardware components of the device(s) described herein (e.g., as in FIGS. 1 and 5) to, for example, generate blended sensor-based (e.g., LIDAR-based) visualizations. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (402), the method 400 can include obtaining sensor data associated with the surrounding environment of a vehicle. For instance, the computing device(s) 124 onboard the vehicle 102 can obtain sensor data 110 associated with the surrounding environment of the vehicle 102. The sensor data 110 can be acquired via a LIDAR system of the vehicle 102 (and/or another type of sensor). The sensor data 110 can include, for example, a plurality of points that correspond to a portion of the surrounding environment (e.g., one or more objects) that have reflected one or more ranging lasers within a three-dimensional space relative to the LIDAR system (e.g., as the vehicle is in motion, stopped).

At (404), the method 400 can include generating a first style sheet. For instance, the computing device(s) 124 can generate a first style sheet 202A associated with the surrounding environment of the vehicle 102 based at least in part on the sensor data 110. The first style sheet 202A can be descriptive of at least a portion of the surrounding environment based at least in part on a respective height of each of the one or more ranging lasers (of a LIDAR system).

At (406), the method 400 can include generating a second style sheet. For instance, the computing device(s) 124 can generate a second style sheet 202B associated with the surrounding environment of the vehicle 102 based at least in part on the sensor data 110. The second style sheet 202B can be different than the first style sheet 202A. For example, the second style sheet 202B can be descriptive of at least a portion of the surrounding environment based at least in part on a reflective intensity of one or more of the ranging lasers (of a LIDAR system) with respect to the at least one object.

At (408), the method 400 can include blending the first style sheet and the second style sheet. For instance, the computing device(s) 124 can blend the first style sheet 202A and the second style sheet 202B. Such blending can allow for the description of an object (e.g., a vehicle, pedestrian, lane marking) based at least in part on a respective height of each of the one or more ranging lasers (e.g., as in the first style sheet 202A) and based at least in part on a reflective intensity of one or more of the ranging lasers with respect to the at least one object (e.g., as in the second style sheet 202B).

At (410)-(414), the method 400 can include obtaining perception data associated with an object proximate to the vehicle, obtaining prediction data associated with an object, and/or motion planning data associated with the vehicle. For instance, the computing device(s) 124 can obtain the perception data 118 (e.g., indicative of an identifier shape 312) of at least one object within the surrounding environment of the vehicle 102. Additionally, or alternatively, the computing device(s) 124 can obtain prediction data 120 indicative of a predicted trajectory 314 of at least one object within the surrounding environment of the vehicle 102. Additionally, or alternatively, the computing device(s) 124 can obtain motion planning data 122 indicative of a planned trajectory 316 of the vehicle 102.

At (416), the method 400 can include providing for display an output based at least in part on the first and second style sheets. For instance, the computing device(s) 124 can provide an output 126 for display via a user interface 302 of a display device 300. The output 126 can include a visualization 304 of the surrounding environment of the vehicle 102 based at least in part on the first style sheet 202A and the second style sheet 202B. For example, the output can based at least in part on the blending of the first style sheet 202A and the second style sheet 202B. The visualization 304 can present at least a portion of the surrounding environment (e.g., an object) based at least in part on the respective height of each of the one or more ranging lasers and based at least in part on the reflective intensity of one or more of the ranging lasers with respect to the object. In some implementations, the visualization 304 can present (e.g., visually present) the identifier shape 312 of the at least one object 310 within the surrounding environment of the vehicle 102. Additionally, or alternatively, the visualization 304 can present the predicted trajectory 314 of at least one object 306 within the surrounding environment of the vehicle 102. The visualization 304 can also, or alternatively, present the planned trajectory 316 of the vehicle 102.

As described herein, a display device 300 can be located onboard and/or remote from the vehicle 102. For instance, a display device 300 can located on-board the vehicle 102 and can be configured to display the visualization 304 via the user interface 302 to a user 130 (e.g., passenger) of the vehicle 102. Additionally, or alternatively, a display device 300 can be remote from the vehicle 102 and can be configured to display the visualization 304 via the user interface 302 at a location that is remote from the vehicle 102. A user 130 can view the visualization 304 to understand how the vehicle 102 perceives its surrounding environment as well as the objects within the surrounding environment, how the vehicle 102 predicts the motion of the objects, and/or how the vehicle 102 plans the motion of the vehicle.

In some implementations, a vehicle anomaly can be detected based at least in part on the output 126. For instance, one or more computing devices of the onboard vehicle computing system 100 (e.g., computing devices 124, other computing devices) and/or one or more remote computing devices (e.g., of a remote operations center) can receive the output 126. The computing device(s) can determine an operational vehicle anomaly associated with the vehicle 102 based at least in part on the output 126. For instance, the computing device(s) can compare the output 126 to the map data 111 to determine whether the vehicle 102 is failing to perceive features and/or objects described by the map data 111. By way of example, the computing device(s) can determine if the vehicle 102 is failing to detect and/or appropriately plan for one or more lane markings, sidewalks, etc. as described by the map data 111. The vehicle anomaly can be a failure associated with at least one of the vehicle's onboard systems (e.g., sensors, perception system, prediction system, motion planning system). For example, a vehicle anomaly can exist if an object is at least partially omitted from the output 126 (and/or corresponding visualization), the vehicle 102 fails to properly plan its motions based at least in part on the object (e.g., as indicated by the planned trajectory 316), etc.

In some implementations, the computing device(s) can determine whether the vehicle 102 is correctly detecting object(s) (e.g., static, non-static) within the surrounding environment based at least in part on data in addition to, or alternatively from, the map data 111. For example, the computing device(s) can compare data indicative of one or more object(s) proximate to the vehicle to the output 126 to determine whether the vehicle 102 is failing to detect, predict, and/or appropriately plan for the one or more objects (e.g., the objects are at least partially omitted from the output, corresponding visualization). The data indicative of the objects can be test data (e.g., used for testing the vehicles in a test environment), data acquired from another vehicle (e.g., autonomous vehicle within a fleet), and/or other source of data. A vehicle anomaly can exist in the event that an object is at least partially omitted from the output 126 (and/or corresponding visualization 304), the output 126 (and/or corresponding visualization 304) indicates an inaccurate predicted trajectory of the object, the output 126 (and/or corresponding visualization 304) indicates an inaccurate planned trajectory of the vehicle 102, etc.

The computing device(s) can determine a maintenance plan for the vehicle 102 based at least in part on a detected anomaly. For example, in the event that the detected vehicle anomaly is associated with the data acquisition system(s) 104 and/or the sensor data 110, the maintenance plan can include servicing of the data acquisition system(s) 104. In the event that the detected vehicle anomaly is associated with the perception system 112 and/or the perception data 118, the maintenance plan can include servicing of the perception system 112. In the event that the detected vehicle anomaly is associated with the prediction system 114 and/or the prediction data 120, the maintenance plan can include servicing of the prediction system 114. In the event that the detected vehicle anomaly is associated with the motion planning system 116 and/or the motion planning data 122, the maintenance plan can include servicing of the motion planning system 116. In some implementations, the computing device(s) can automatically schedule maintenance for the vehicle 102 and route the vehicle 102 to a maintenance location (e.g., a service depot) accordingly.

Figure 5:
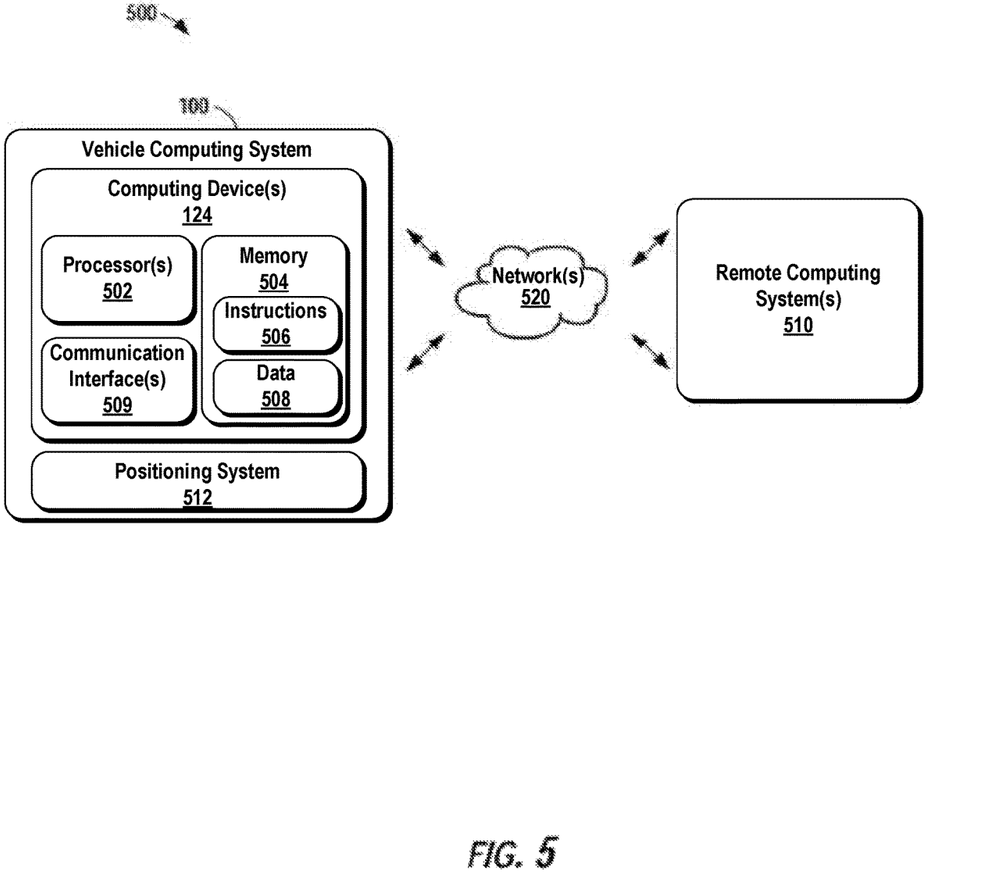
FIG. 5 depicts example system components according to example embodiments of the present disclosure.

FIG. 5 depicts an example computing system 500 according to example embodiments of the present disclosure. The example system 500 illustrated in FIG. 5 is provided as an example only. The components, systems, connections, and/or other aspects illustrated in FIG. 5 are optional and are provided as examples of what is possible, but not required, to implement the present disclosure. The example system 500 can include the vehicle computing system 100 of the vehicle 102 and, in some implementations, a remote computing system 510 including remote computing device(s) that is remote from the vehicle 102 (e.g., including remote computing devices) that can be communicatively coupled to one another over one or more networks 520. The remote computing system 510 can be associated with a central operations system and/or an entity associated with the vehicle 102 such as, for example, a vehicle owner, vehicle manager, fleet operator, service provider, etc.

The computing device(s) 124 of the vehicle computing system 100 can include processor(s) 502 and a memory 504. The one or more processors 502 can be any suitable processing device (e.g., a processor core, a microprocessor, an ASIC, a FPGA, a controller, a microcontroller, etc.) and can be one processor or a plurality of processors that are operatively connected. The memory 504 can include one or more non-transitory computer-readable storage media, such as RAM, ROM, EEPROM, EPROM, one or more memory devices, flash memory devices, etc., and combinations thereof.

The memory 504 can store information that can be accessed by the one or more processors 502. For instance, the memory 504 (e.g., one or more non-transitory computer-readable storage mediums, memory devices) on-board the vehicle 102 can include computer-readable instructions 506 that can be executed by the one or more processors 502. The instructions 506 can be software written in any suitable programming language or can be implemented in hardware. Additionally, or alternatively, the instructions 506 can be executed in logically and/or virtually separate threads on processor(s) 502.

For example, the memory 504 on-board the vehicle 102 can store instructions 506 that when executed by the one or more processors 502 on-board the vehicle 102 cause the one or more processors 502 (the computing system 100) to perform operations such as any of the operations and functions of the computing device(s) 124 or for which the computing device(s) 124 are configured, as described herein, such as the operations for generating blended sensor-based (e.g., LIDAR-based) visualizations (e.g., one or more portions of method 400), and/or any other functions for generating blended sensor-based (e.g., LIDAR-based) visualizations, detecting vehicle anomalies, scheduling maintenance, etc. as described herein.

The memory 504 can store data 508 that can be obtained, received, accessed, written, manipulated, created, and/or stored. The data 508 can include, for instance, sensor data, perception data, predicted data, motion planning data, map data, blended data, other data associated with one or more objects, data associated with one or more style sheets, data associated with an output, data associated with a vehicle anomaly, data associated with a vehicle maintenance, and/or other data/information as described herein. The memory 504 (e.g., one or more memory device(s)) can be split up as to be located in multiple locales on-board the vehicle 102. In some implementations, the computing device(s) 124 can obtain data from one or more memory device(s) that are remote from the vehicle 102.

The computing device(s) 124 can also include a communication interface 509 used to communicate with one or more other system(s) on-board the vehicle 102 and/or a remote computing device that is remote from the vehicle 102 (e.g., of remote computing system 510). The communication interface 509 can include any circuits, components, software, etc. for communicating with one or more networks (e.g., 520). In some implementations, the communication interface 509 can include including, for example, one or more of a communications controller, receiver, transceiver, transmitter, port, conductors, software and/or hardware for communicating data.

In some implementations, the vehicle computing system 100 can further include a positioning system 512. The positioning system 512 can determine a current position of the vehicle 102. The positioning system 512 can be any device or circuitry for analyzing the position of the vehicle 102. For example, the positioning system 512 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 100.

The network(s) 520 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 520 can be accomplished, for instance, via a communication interface using any type of protocol, protection scheme, encoding, format, packaging, etc.

The remote computing system 510 can include one or more remote computing devices that are remote from the vehicle computing system 100. The remote computing devices can include components (e.g., processor(s), memory, instructions, data) similar to those described herein for the computing device(s) 124.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

What is claimed is:

1. A computer-implemented method of generating blended LIDAR-based visualizations, comprising:

obtaining, by one or more computing devices onboard an autonomous vehicle, sensor data associated with a surrounding environment of the autonomous vehicle, wherein the sensor data is acquired via a LIDAR system of the autonomous vehicle;

generating, by the one or more computing devices, a first style sheet associated with the surrounding environment of the autonomous vehicle based at least in part on the sensor data, the first style sheet is descriptive of at least a portion of the surrounding environment including a first object using a LIDAR by height type representation;

generating, by the one or more computing devices, a second style sheet associated with the surrounding environment of the autonomous vehicle based at least in part on the sensor data, wherein the second style sheet is different from the first style sheet and is descriptive of the at least a portion of the surrounding environment including a second object using a LIDAR by intensity type representation;

blending, by the one or more computing devices, the first style sheet and the second style sheet to provide a visualization of the first object using the LIDAR by height type representation and the second object using the LIDAR by intensity type representation; and providing, by the one or more computing devices, an output for display via a user interface of a display device, the output comprising a visualization of the surrounding environment of the autonomous vehicle based at least in part on the blending of the first style sheet and the second style sheet, the visualization representing the at least a portion of the surrounding environment using the LIDAR by height type representation and the LIDAR by intensity type representation.

2. The computer-implemented method of claim 1, wherein the sensor data comprises a plurality of points that correspond to at least a portion of the surrounding environment that have reflected one or more ranging lasers within a three-dimensional space relative to the LIDAR system.

3. The computer-implemented method of claim 2, wherein the first style sheet is descriptive of at least a portion of the surrounding environment based at least in part on a respective height of each of the one or more ranging lasers.

4. The computer-implemented method of claim 2, wherein the second style sheet is descriptive of at least a portion of the surrounding environment based at least in part on a reflective intensity of one or more of the ranging lasers.

5. The computer-implemented method of claim 1, further comprising:
obtaining, by the one or more computing devices, perception data indicative of an identifier shape of at least one object within the surrounding environment of the autonomous vehicle, and
wherein the visualization presents the identifier shape of the at least one object within the surrounding environment of the autonomous vehicle.

6. The computer implemented method of claim 1, further comprising:
obtaining, by the one or more computing devices, prediction data indicative of a predicted trajectory of at least one object within the surrounding environment of the autonomous vehicle, and
wherein the visualization presents the predicted trajectory of the at least one object within the surrounding environment of the autonomous vehicle.

7. The computer implemented method of claim 1, further comprising:
obtaining, by the one or more computing devices, motion planning data indicative of a planned trajectory of the autonomous vehicle, and
wherein the visualization presents the planned trajectory of the autonomous vehicle.

8. The computer-implemented method of claim 1, wherein the display device is located on-board the autonomous vehicle and is configured to display the visualization via the user interface to a passenger of the autonomous vehicle.

9. The computer-implemented method of claim 1, wherein the display device is remote from the autonomous vehicle and is configured to display the visualization via the user interface at a location that is remote from the autonomous vehicle.

10. A computing system for generating blended LIDAR-based visualizations, comprising:
one or more processors on-board an autonomous vehicle; and
one or more tangible, non-transitory, computer readable media on-board the autonomous vehicle that collectively store instructions that when executed by the one or more processors cause the computing system to perform operations, the operations comprising:
obtaining, via a LIDAR system that emits one or more ranging lasers, sensor data associated with a surrounding environment of the autonomous vehicle;
generating a first style sheet associated with the surrounding environment of the autonomous vehicle based at least in part on the sensor data, wherein the first style sheet is descriptive of at least a portion of the surrounding environment including a first object based at least in part on a respective height of each of the one or more ranging lasers;
generating a second style sheet associated with the surrounding environment of the autonomous vehicle based at least in part on the sensor data, wherein the second style sheet is different from the first style sheet, and wherein the second style sheet is descriptive of at least a portion of the surrounding environment including a second object based at least in part on a reflective intensity of one or more of the ranging lasers; and
providing an output for display via a user interface of a display device, the output comprising a visualization of the surrounding environment of the autonomous vehicle based at least in part on a blending of the first style sheet and the second style sheet, the visualization representing the at least a portion of the surrounding environment including the first object using a LIDAR by height type representation associated with the first style sheet and the second object using a LIDAR by intensity type representation associated with the second style sheet.

11. The computing system of claim 10, wherein the first style sheet comprises a color scheme that is based at least in part on the respective height of each of the one or more ranging lasers.

12. The computing system of claim 10, wherein the visualization presents an object based at least in part on the respective height of each of the one or more ranging lasers and based at least in part on the reflective intensity of one or more of the ranging lasers with respect to the object.

13. The computing system of claim 12, wherein the object is a vehicle or a pedestrian that is proximate to the autonomous vehicle.

14. The computing system of claim 12, wherein the object is a lane marking.

15. The computing system of claim 10, wherein the output is provided for display on-board the autonomous vehicle or for display at a location that is remote from the autonomous vehicle.

16. An autonomous vehicle comprising:
a LIDAR system;
one or more processors; and
one or more tangible, non-transitory, computer readable media that collectively store instructions that when executed by e one or more processors cause the one or more processors to perform operations, the operations comprising:
obtaining sensor data associated with the surrounding environment of the autonomous vehicle, wherein the sensor data is acquired via the LIDAR system;
generating a first style sheet associated with the surrounding environment of the autonomous vehicle based at least in part on the sensor data, the first style sheet is descriptive of at least a portion of the surrounding environment including a first object using a LIDAR by height type representation;
generating a second style sheet associated with the surrounding environment of the autonomous vehicle based at least in part on the sensor data, the second style sheet is descriptive of the at least a portion of the surrounding environment including a second object using a LIDAR by intensity type representation;
blending the first style sheet and the second style sheet to provide a visualization of the first object using the LIDAR by height type representation and the second object using the LIDAR by intensity type representation; and
providing an output for display via a user interface of a display device, the output comprising a visualization of the surrounding environment of the autonomous vehicle based at least in part on the blending of the first style sheet and the second style sheet, the visualization representing the at least a portion of the surrounding environment using the LIDAR by height type representation and the LIDAR by intensity type representation.

17. The autonomous vehicle of claim 16, wherein the sensor data comprises a plurality of points that correspond to one or more objects that have reflected a ranging laser within a three-dimensional space relative to the LIDAR system as the vehicle is in motion.

18. The autonomous vehicle of claim 16, wherein the user interface is displayed in real-time as the autonomous vehicle is in motion.

19. The autonomous vehicle of claim 16, wherein the visualization comprises at least one of an identifier shape of at least one object within the surrounding environment of the autonomous vehicle, a predicted trajectory of the at least one object within the surrounding environment of the autonomous vehicle, or a planned trajectory of the autonomous vehicle.

\* \* \* \* \*